(12) United States Patent
Gisby

(10) Patent No.: US 8,315,609 B2
(45) Date of Patent: Nov. 20, 2012

(54) PERSONAL CALL CENTER

(75) Inventor: Douglas Gisby, Atlanta, GA (US)

(73) Assignee: Research In Motion Limited, Waterloo, Ontario (CA)

( * ) Notice: Subject to any disclaimer, the term of this patent is extended or adjusted under 35 U.S.C. 154(b) by 324 days.

(21) Appl. No.: 12/388,634

(22) Filed: Feb. 19, 2009

(65) Prior Publication Data
US 2010/0210249 A1 Aug. 19, 2010

(51) Int. Cl.
H04M 3/42 (2006.01)
(52) U.S. Cl. .................. 455/414.1; 455/410; 455/412.2; 455/560; 455/466; 379/220.01; 379/211.02
(58) Field of Classification Search ............... 455/414.1, 455/410, 412.2, 560, 466; 370/260, 261; 379/202.1, 211.02, 220.01, 266.07, 266
See application file for complete search history.

(56) References Cited

U.S. PATENT DOCUMENTS

| | | | |
|---|---|---|---|
| 5,621,790 A | 4/1997 | Grossman et al. | |
| 2002/0006193 A1 * | 1/2002 | Rodenbusch et al. | .... 379/266.01 |
| 2006/0072726 A1 * | 4/2006 | Klein et al. | ............... 379/201.01 |
| 2007/0130260 A1 * | 6/2007 | Weintraub et al. | ............. 709/204 |
| 2008/0032679 A1 * | 2/2008 | Purontaus et al. | ............. 455/417 |
| 2008/0159521 A1 * | 7/2008 | Sneyders et al. | ......... 379/266.07 |

FOREIGN PATENT DOCUMENTS

| | | |
|---|---|---|
| WO | 97/35415 A | 9/1995 |
| WO | 2006/037836 A | 4/2006 |

OTHER PUBLICATIONS

Extended European Search Report dated Sep. 30, 2009, issued for corresponding European Patent Application No. 09153252.3.

* cited by examiner

*Primary Examiner* — Kamran Afshar
*Assistant Examiner* — Manpreet Matharu
(74) *Attorney, Agent, or Firm* — Norton Rose Canada LLP

(57) ABSTRACT

A personal call center that can schedule calls for a user, make the call at the scheduled time and connect the user when the other party answers, thus making the calls completely "hands free" and transparent for the user. In essence, the system can make an outbound call look and act like an inbound call. Advantageously, the system can also be used by a manager or a centralized call center to schedule calls for a given user or group of users. This way, managers or call centers can schedule calls, between salespersons and customers, and have calls go through without interaction from the salesperson.

13 Claims, 8 Drawing Sheets

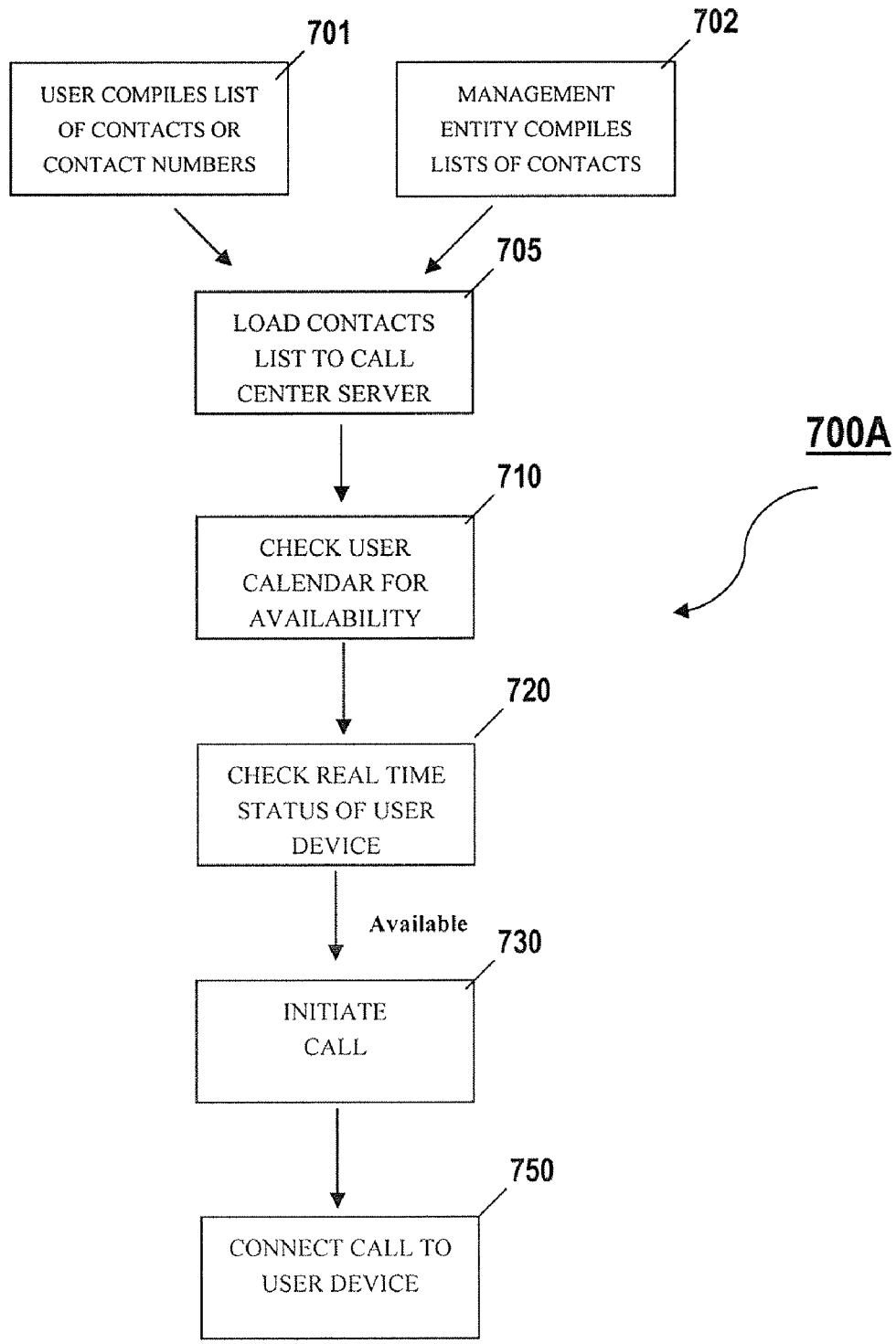

PERSONAL CALL CENTER

FIELD

The present application relates to the field of mobile communications, specifically, providing personal call centers for mobile communication devices.

BACKGROUND

Smartphones have become the centerpiece of the digital lifestyle for mobile professionals. So ubiquitous is their use that they enable mobile professionals to operate in their professional capacity at nearly any time or place. There are times, however, when necessary information (such as whom to call and when) might not be easy to reference when, e.g., professionals are working remotely.

BRIEF DESCRIPTION OF THE DRAWINGS

Reference will now be made, by way of example, to the accompanying drawings which show example embodiments of the present application, and in which:

FIGS. 7A-7C illustrate examples of call processes carried out in accordance with an embodiment disclosed herein.

Similar reference numerals may have been used in different figures to denote similar components.

DESCRIPTION OF EXAMPLE EMBODIMENTS

Figure 1:
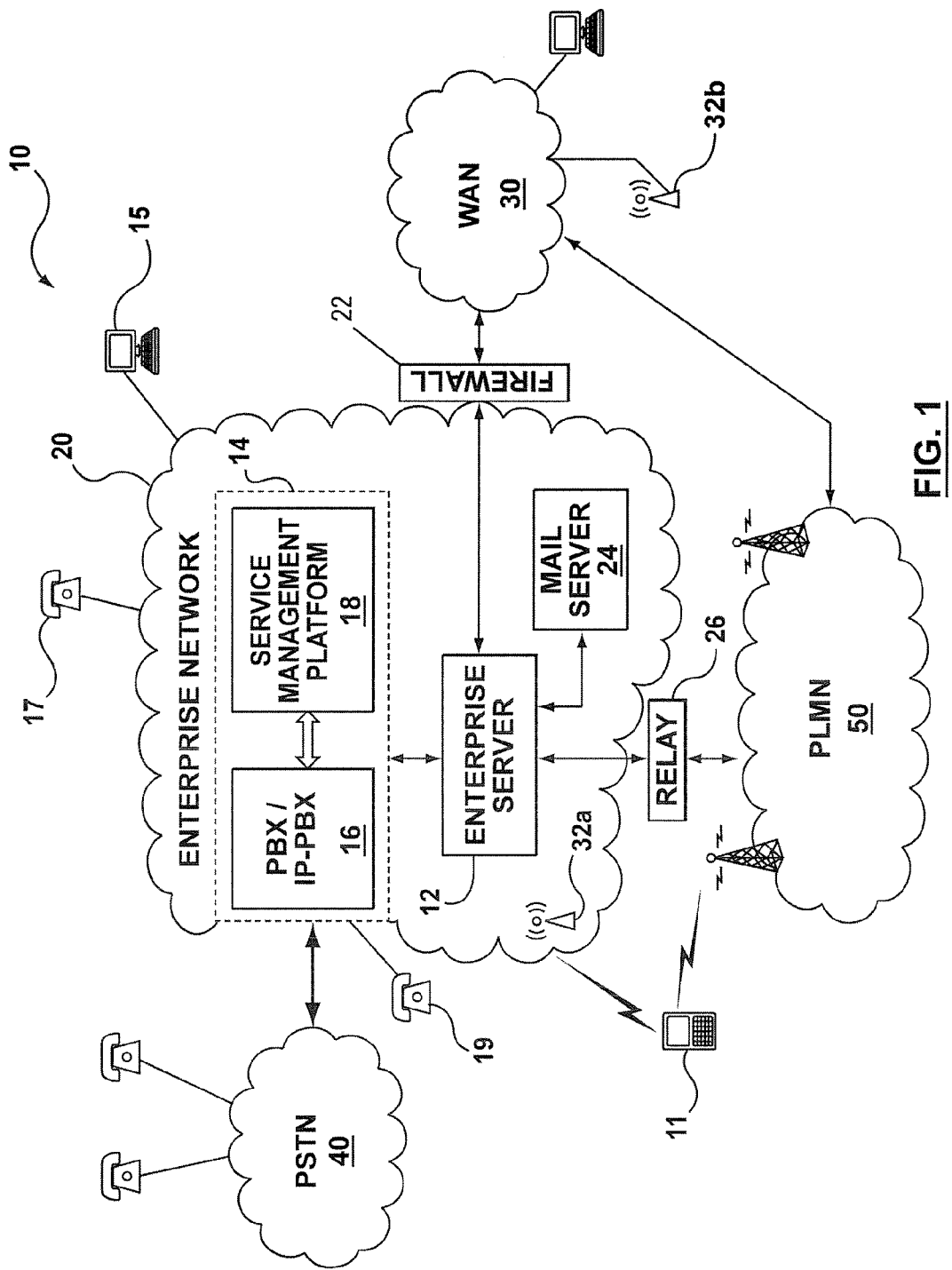
FIG. 1 shows, in block diagram form, an example system for managing enterprise-related mobile calls, including an enterprise communications platform.

In one aspect, the present application provides a personal call center system. The system comprises a first server for facilitating telephone calls to at least one user, each user being associated with a mobile communication device, the server being programmed to perform the steps of: receiving a list of contact numbers, each contact number corresponding to a call to be made, determining, based on a schedule of the at least one associated user, whether the at least one user is available for calls to be made; initiating, if the at least one user is determined to be available, a call to one of the contact numbers; and connecting the call to the mobile communication device associated with the user.

Another embodiment includes a personal call center that includes a second server which determines a real-time status of the device assigned to the user before the first server initiates calls to that device. In an optional step, the call center can wait a predetermined time if the device status is unavailable. This step can be repeated until the device is available.

In another aspect, the present application provides a method of facilitating telephone calls to a mobile communication device associated with a user. The method comprises receiving a list of contact numbers, each contact number corresponding to a call to be made to the device; determining, based on a schedule associated with the user, whether the user is available for calls to be made; retrieving a real-time status of the mobile communication device; initiating a call to a contact number on the list; and connecting the call to the mobile communication device; and on completion of said call.

Another embodiment in which telephone calls to a mobile communication device associated with a user are facilitated includes a step of waiting for a recipient of each call to answer before connecting the call to the device. An optional step includes notifying the mobile communication device once all telephone calls have been completed.

In yet another aspect, the present application provides a method of facilitating a series of telephone calls to a group of mobile communication devices each associated with a respective user. The method comprises receiving a list of contact numbers, each contact number corresponding to a call to be made to the group of devices, determining, based on a schedule associated with each user, whether the users are available; retrieving a real-time status of each mobile communication device; initiating calls to one of the contact numbers for each of the mobile communication devices associated with the users determined to be available; and connecting the calls to one of the available mobile communication devices. Another embodiment includes a step of detecting if a recipient of an initiated call is unavailable and to leave a prerecorded voicemail for the recipient.

A further embodiment provides a system for facilitating a series of telephone calls to a group of associated telephony devices. The system comprises at least a first server for facilitating the telephone calls, the server being programmed to perform the steps of: receiving data corresponding to identification information for the group of associated telephony devices; receiving a list of recipients to be called, determining, based on at least a schedule of a user associated with each of the telephony devices, whether the user is available for calls to be made; initiating, if the at least one user is determined to be available, a call to one of the contact numbers; and connecting the call to the telephony device associated with the user. In an optional step, the first server is operable to query each telephony device to determine a real-time status of the device and determine whether it is currently in use.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
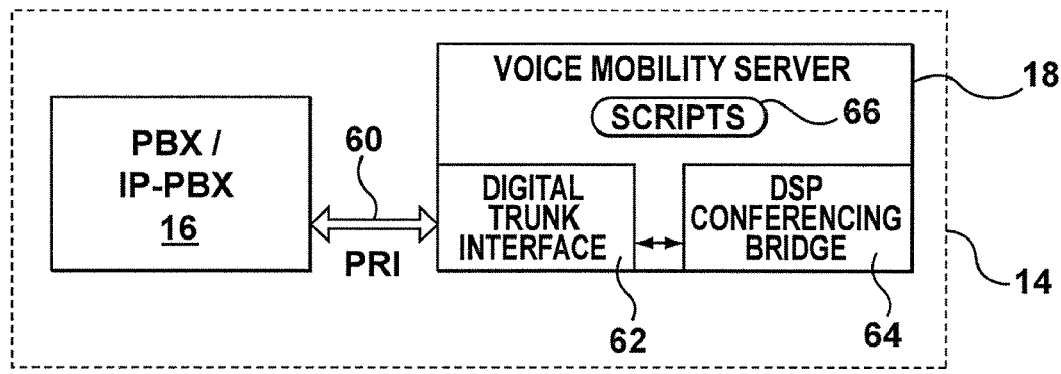
FIG. 2 shows, in block diagram form, further details of an embodiment of the enterprise communications platform.
Figure 3:
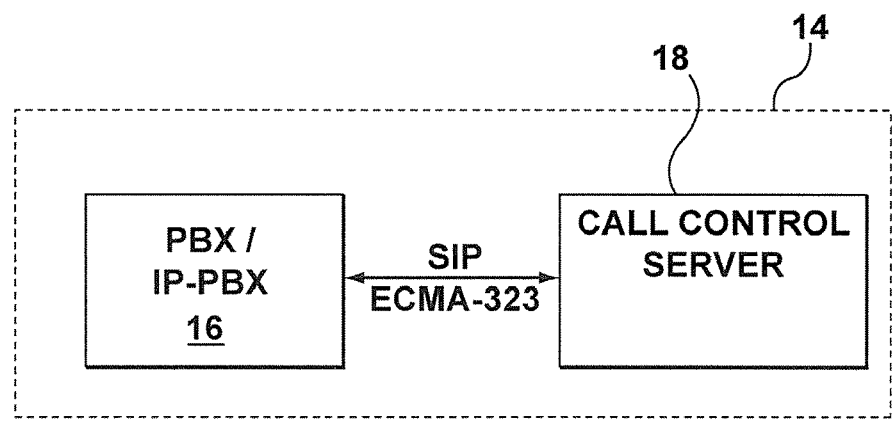
FIG. 3 shows another embodiment of the enterprise communications platform.
Figure 4:
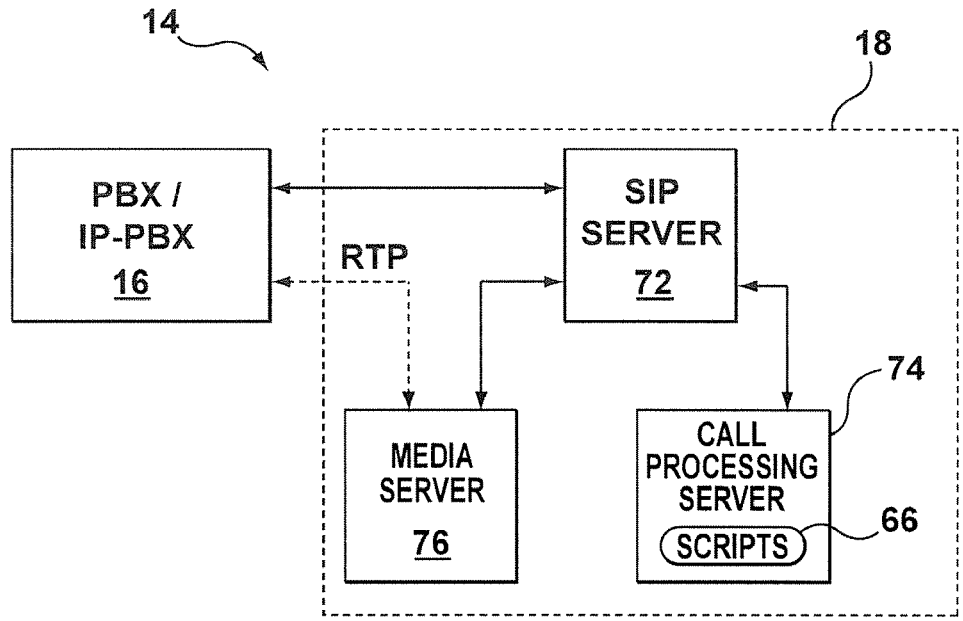
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts 66 or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
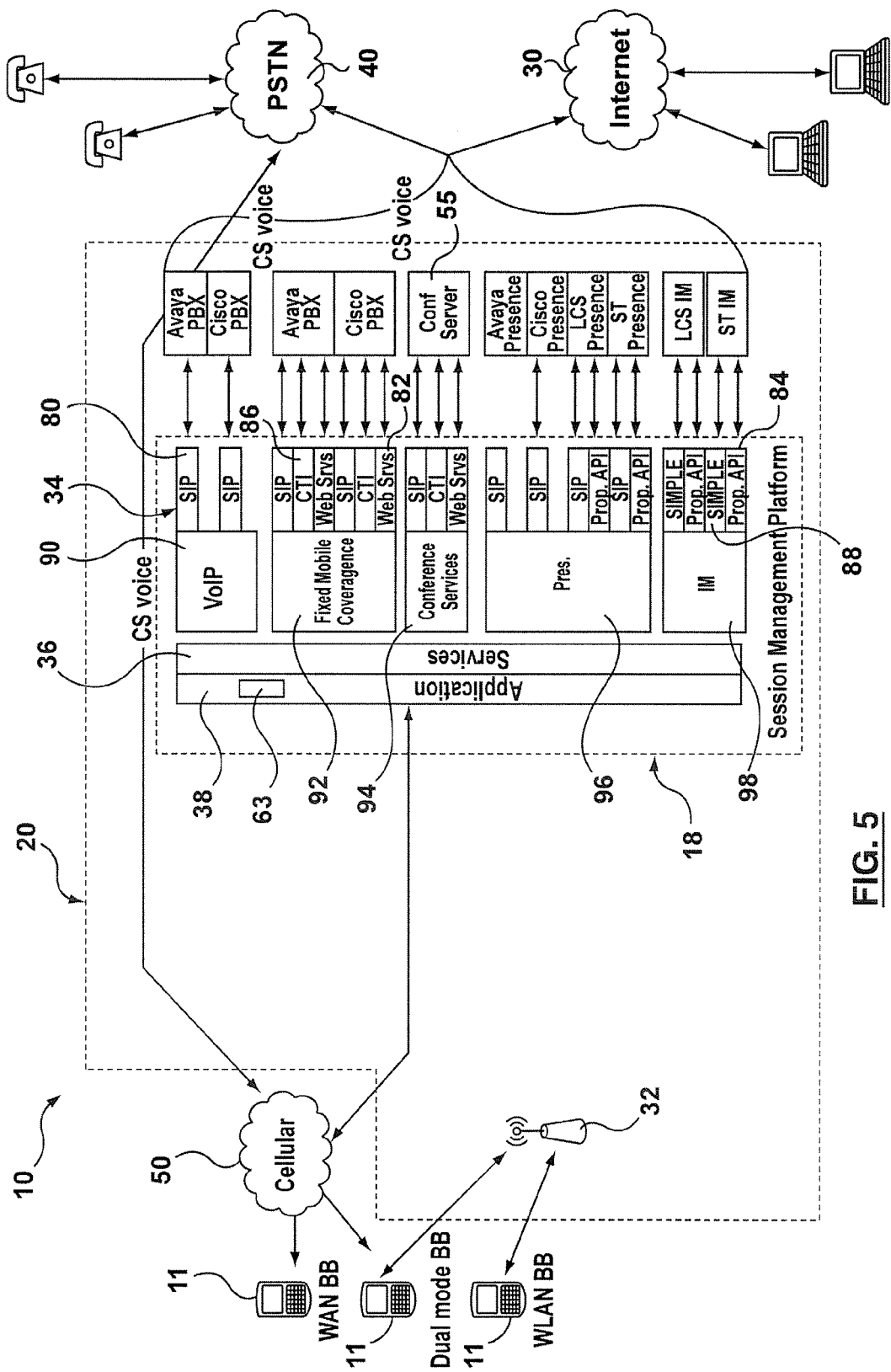
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application.

For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

The disclosed system (the "call center server") can schedule calls for a user, make the call at the scheduled time and connect the user when the other party answers, thus making the calls completely "hands free" and transparent for the user. The call center server is adapted to run in application layer 38 on SMP 18, however, it is understood that the call center server could be implemented to run on a separate system apart from SMP 18, or be implemented by combining the function of several connected components. In essence, the disclosed system can make an outbound call look and act like an inbound call. Advantageously, the system can also be used by a manager or a centralized call center to, for example, schedule calls for a given user or group of users. This way, managers or call centers can schedule calls for example, between salespersons and customers, and have the calls go through without any action from the salesperson.

Figure 6:
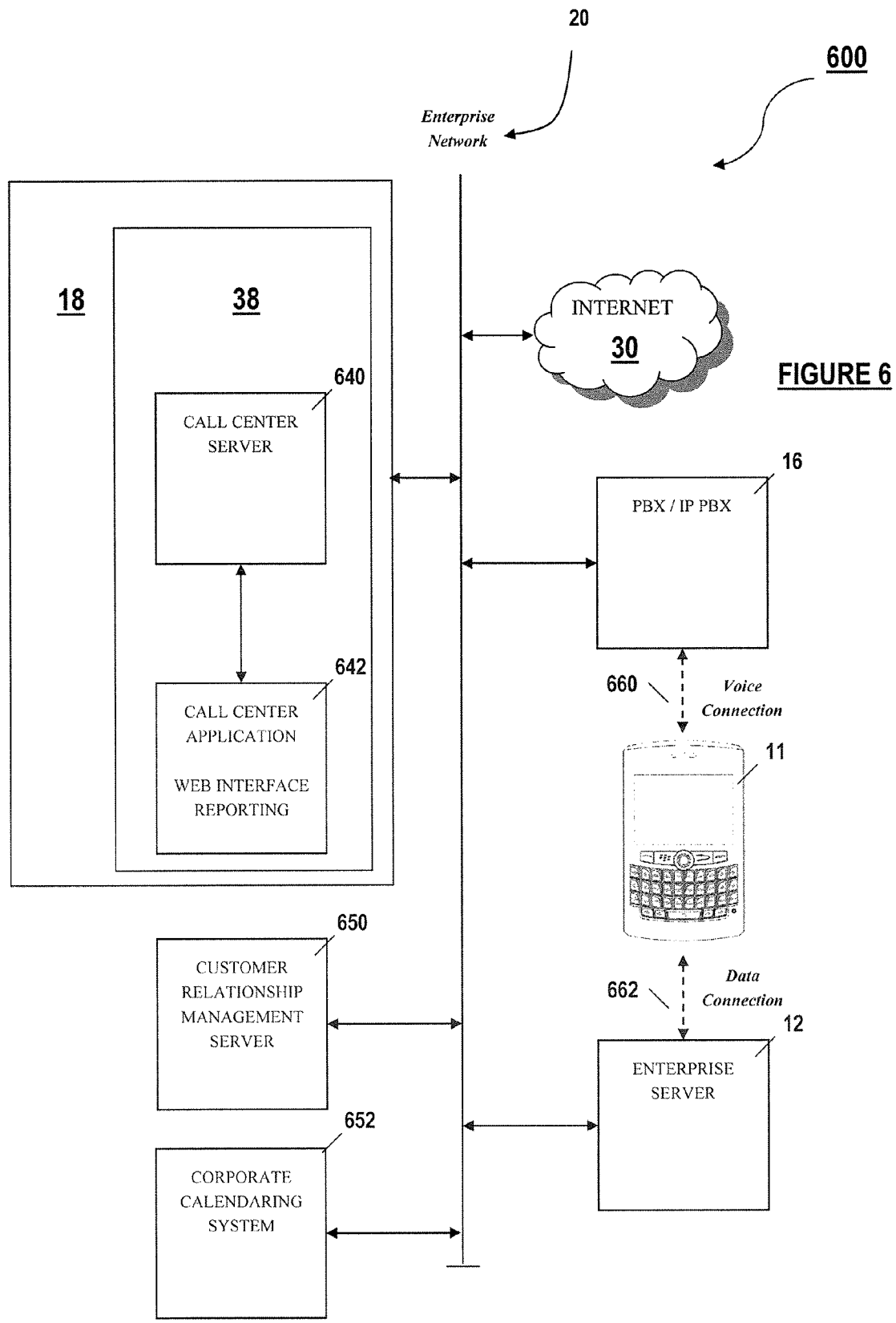
FIG. 6 illustrates an example of a network implemented according to an embodiment disclosed herein.
Figure 7B:
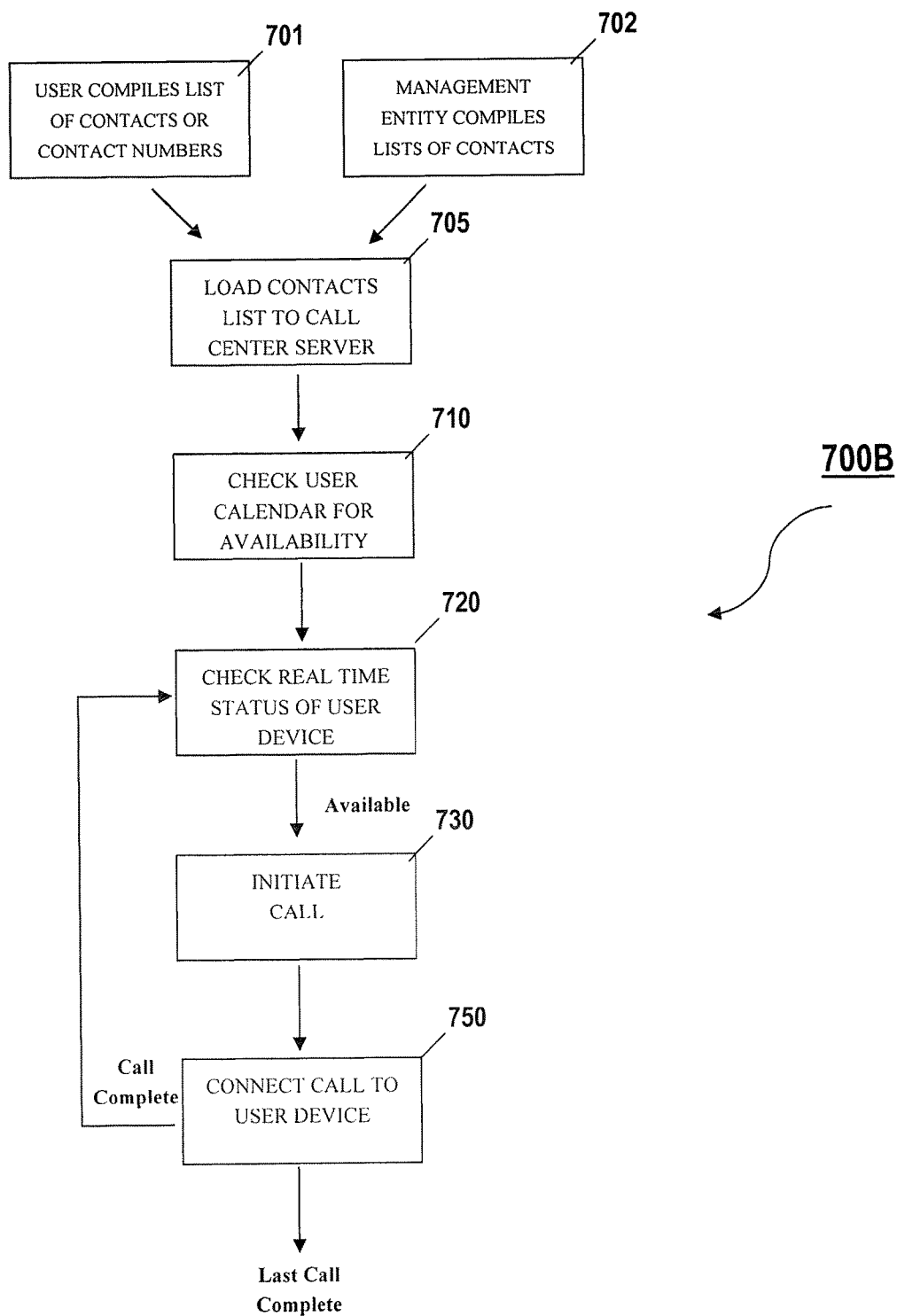
Figure 7C:
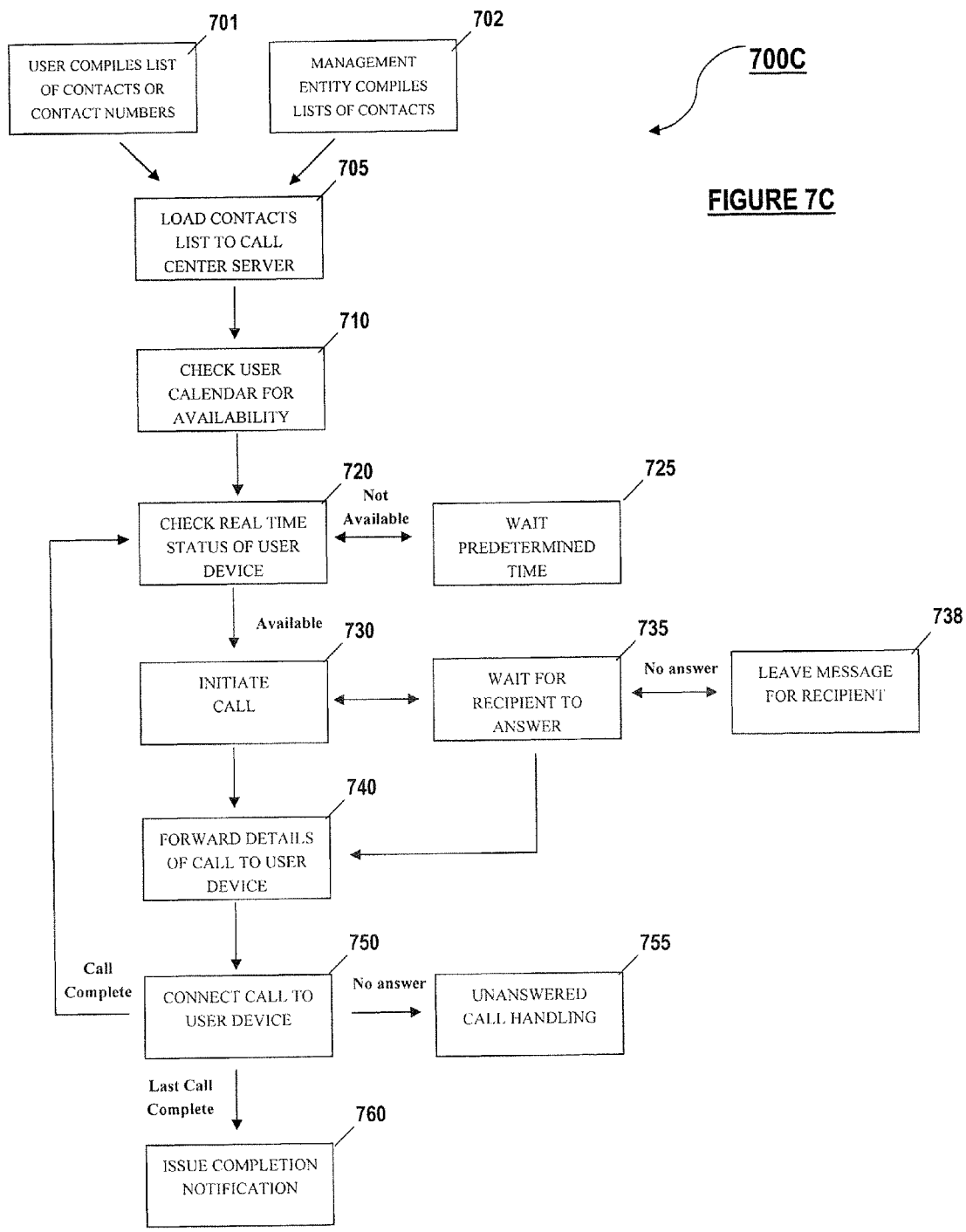

Referring now to FIG. 6, a system 600 including various operational components (representing a subset or simplified version of an enterprise network 20 such as that shown in FIG. 1) is now described. The system 600 is capable of executing the processes described herein (in relation to FIGS. 7A-8). Enterprise network 20 is preferably an internal network, but can also include a connection to the Internet or WAN 30 (as depicted in FIG. 1). A call center application 642 manages call processes as discussed herein (as depicted in FIGS. 7A-7C and 8) and runs as a component of the call center server 640 in application layer 38 on SMP 18, although call center server 640 can be implemented as a separate system. Data from a customer relationship management (CRM) Server 650 can be imported to call center server 640 to populate the contact lists (described below). A web interface to call center server 640 can also be implemented either as part of the same call center application 642 mentioned above or as a separate component to provide data to populate the contact lists. The call center application 642 can optionally provide reports (historical and real time) to users or management entities for specific users or groups to report status including success, failure, time connected, retry count, and the like using the web interface of call center application 842. A corporate calendaring system 652 is provided as an example source for determining availability of users. As also shown in FIG. 1, present on enterprise network 20 is a PBX 16 for connecting telephone calls to an example user device 11 over the device's voice connection 660 (using, for example, PLMN 50 as shown in FIG. 1). PBX 16 can optionally be voice-over-IP enabled (i.e., an IP-PBX). Enterprise Server 12 is also present and enables call center server 640 to determine the real-time status of user device 11 using the device's data connection 662.

Embodiments disclosed herein relate to methods and systems for implementing and operating personal call centers for system users ("call center users"), wherein calls can be made to a list of contacts or contact numbers with little or no interaction with the call center user. The call center server 640 is adapted to initiate these calls to the contacts on the list and then connect the call to a call center user when the contact has answered the call. Example processes 700A, 700B and 700C are now described with reference to FIGS. 7A-7C.

With reference to FIG. 7A, in a first embodiment, call center server 640 initiates and places a single call to a call center user in process 700A. At step 701, an initial step of compiling a list of contacts and/or contact numbers ("a contact list") can be compiled by a user, or by a user's manager. Alternately, or in combination, the compiling step may be done by a customer relationship management (CRM) entity (e.g., CRM server 650) adapted to compile such lists (at step 702). At step 705, the contact list is uploaded to the call center server 640. The uploading can be done on an individual or group basis via any one or a combination of various mechanisms. These methods include a web-enabled user interface that would import contact information from a third party contact management system where the user/manager would use the user interface to create the contact list; a Web Services API where a contact list could be exported directly from a third party application and imported to the call center server 640; or, by a comma separated file or a spreadsheet. The customer relationship management (CRM) entity can build a contact list from any number of sources, including a call center user's contact management system such as Microsoft Office Outlook®, IBM Lotus Notes®, ACT, Microsoft Dynamics CRM®, Oracle CRM, or any other such system.

The contact list can be accompanied by a schedule that can specify, the times at which the calls to contacts are to be made (in sequential order); when the call center server 640 should begin or end calling contacts; and/or specific times for calling specific contacts on the list. The contact list and optional schedule are loaded onto the call center server 640 at step 705, which enables the call center server 640 to process the calls.

Next, at step 710, the call center server 640 is adapted to consult a corporate calendaring system (e.g., the corporate calendaring system 652 depicted in FIG. 6) to determine a call center user's availability over the time period necessary to complete the call. The corporate calendaring system can be one of Microsoft Exchange Server®, or the like. If the call center user is unavailable during the time period in question, execution of the call routine can be held for a predetermined period, or presented to an administrator of the call center server 640 as requiring an adjustment to compensate for the unavailability. If the call center user is available, the call center server 640 proceeds step 720, where it monitors the real-time status of a mobile communication device (e.g., a BlackBerry™, Palm Treo™, or Apple iPhone™]) assigned to the call center user to determine whether the call center user was receiving or initiating a call (or other event) that would prevent the user from taking the new/scheduled call. This monitoring can be done using by any known mechanism, such as a connection to the service provider of the device, or through Enterprise Server 12 (depicted in FIG. 1).

If the call center user's device is determined to be available, the call center server 640 will proceed to step 730 and initiate the call. The call center server 640 can then immediately proceed to step 750 and connect the call to the device.

In a second embodiment (depicted in FIG. 7B as process 700B), call center server 640 operates to initiate and connect a series of calls to a call center user. Process 700B proceeds as described above, but after completion of each call, step 720 of determining the real-time status of the user's device is repeated. In this manner, call center server 640 can continuously monitor the status of the device before initiating and connecting the next of the series of calls. In an alternative embodiment, step 720 is not repeated and call center server 640 proceeds to step 730.

In a third embodiment (depicted in FIG. 7C as process 700C), call center server 640 is configured to perform various other functions as it facilitates the series of calls to the user. First, if at step 720 it is determined if a call center user's device is in use, the call center server 640 can wait a predetermined time (step 725) before repeating the step of retrieving the real-time status of the device (step 720). In this manner, the call center server 640 is adapted to wait until the call center user is available before initiating the next call on the contact list. Further, after a call is initiated (at step 730), call center server 640 can wait (at step 735) for the recipient to answer the call before transferring it to the user device. If the recipient does not answer and the call is forwarded to voicemail, or the call is unsuccessful, the call can be rescheduled within the contact list, and a number of retry attempts can be recorded. If the call reaches voicemail, the call center server 640 will leave a personalized automated message that the call center user has recorded (step 738). As the number of retry attempts can be monitored, the call center server 640 can be programmed not to leave more than a single message even if the recipient did not answer on multiple occasions; alternatively, the call center server 640 can leave a different personalized message depending on the number or retry attempts. In process 700C, before connecting the call to the user device (step 750), the call center server 640 forwards (step 740) details of the call to the user device. At step 750, an outbound call is placed to the device. If the call is answered by the device, call center server 640 will connect the calls (e.g., by bridging). If the call center user does not answer the connected call, at step 755, the call center server 640 will play the recipient a pre-recorded message, or attempt to reach the call center user on another device or at a different contact number (such as the user's desk phone). The call center server 640 may also optionally contact the call center user on multiple numbers or devices simultaneously, such as by the methods described in U.S. PGPub No. 2008/0205616, hereby incorporated by reference in its entirety. In another embodiment, the device is operable to be directly connected to the call (i.e., by operation of a data connection). In such a manner, calls can be connected to the device without user interaction. The notification can be a text message, e-mail, or other form of communication.

Once the call is completed (e.g., at step 750), call center server 640 proceeds back to step 720 to initiate another call. Although not depicted in FIG. 7C, call center server 640 can also optionally perform the step of calendar checking (710) again before initiating that next call. In an alternative embodiment, neither of steps 710 or 720 are repeated and call center server 640 proceeds to step 730. Once the last call is completed, the call center server 640 will, at step 760, send the call center user a completion notification to indicate that all calls on the list have been made and completed. The notification can optionally identify which, if any, calls were unsuccessful and display the number of retry attempts.

Figure 8:
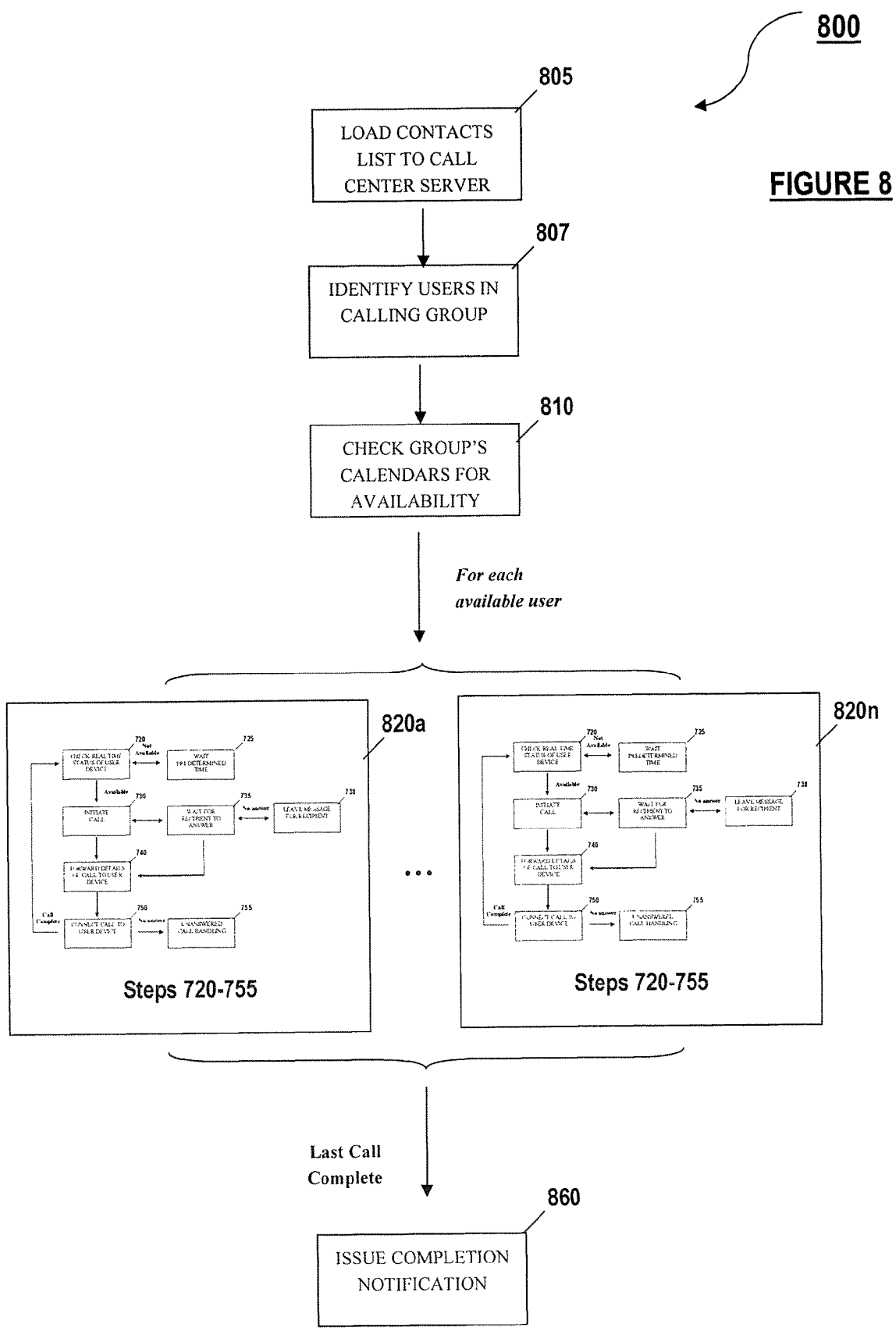
FIG. 8 illustrates an example of another call process carried out in accordance with an embodiment disclosed herein.

In a fourth embodiment, the call center server 640 can be configured to make calls to a compiled list of contacts or contact numbers (by any of the means discussed above with respect to steps 701 and 702 and loaded in step 805) and connect those calls to a group of users (and their associated user devices). Call distribution to a group of users can be advantageous, e.g., in a sales environment where calls can be made to potential contacts irrespective of which user is ultimately connected with the call. This process 800 is shown in FIG. 8. As shown in FIG. 8, at step 805, a compiled contact list is loaded into the call center server 640. Next, at step 807, the call center users in the calling group can be identified by any of the same means used to identify contacts or contact numbers described above (e.g., web-enabled UI, API, or CRM system). At step 810, the call center server 640 checks the calendars of each user in the calling group and determines whether those users are potentially available to take calls from the contact list. The call center server 640 then operates to concurrently initiate and connect calls to available users, proceeding sequentially through the contact list. Accordingly, for each of the potentially available users, at steps 820*a-n*, the call center server 640 performs steps 720-755 described above with respect to FIG. 7C for initiating and completing calls between recipients and available call center users in the group. Once all calls are complete, at step 860, an issue notification can be sent to each or all of the active call center users devices and/or the management entity. The above process as depicted in FIG. 8, however, is not meant to be limiting. Separate contact lists can be loaded for each of the call center users, or specific entries on the contact list can be specially designated so that call center server 640 connects those entries to a specific call center user.

Certain adaptations and modifications of the described embodiments can be made. Therefore, the above discussed embodiments are considered to be illustrative and not restrictive.

What is claimed is:

1. A method of facilitating telephone calls for a mobile communication device associated with a user of a personal call center, the method comprising:
   receiving a list of contact numbers, each contact number corresponding to a call to be made for the mobile communication device on behalf of the user of the call center;
   determining, based on a schedule associated with the user of the call center, whether the user is available for calls to be made;
   retrieving based on said determining, a real-time status of the mobile communication device associated with a user;
   if the real-time status indicates user is available for calls to be made, initiating a call to a recipient from the list of contact numbers; and
   connecting the call to the mobile communication device;
   wherein said retrieving, initiating and connecting steps are repeated until each contact number on the list has been called; and
   notifying the mobile communication device after all contact numbers on the list have been called.

2. The method of claim 1, further including a step of waiting a predetermined time before initiating a call if the real-time status of the device indicates the associated user is unavailable.

3. The method of claim 2, wherein the retrieving and waiting steps are repeated until the real-time status of the mobile communication device indicates that the associated user is available.

4. The method of claim 1, further including a step of waiting for the recipient of said call to answer before connecting the call to the mobile communication device.

5. The method of claim 1, further including a step of forwarding information corresponding to the call to the mobile communication device once the call to the contact number has been initiated.

6. A method of facilitating a series of telephone calls for a group of mobile communication devices each associated with a respective user of a personal call center, the method comprising:
   receiving a list of contact numbers, each contact number corresponding to a call to be made for the group of devices on behalf of the user of the call center,
   determining, based on a schedule associated with each user of the call center, whether the users are available;
   retrieving based on said determining, a real-time status of each mobile communication device;
   initiating calls to a recipient from the list of contact numbers for each of the mobile communication devices associated with the users determined when the real-time status indicates to be available;
   connecting each call to one of the available mobile communication devices;
   repeating said retrieving, initiating and connecting steps for each mobile communication device upon completion of a call to the mobile communication device; and
   notifying the group of mobile communication devices after all contact numbers on the list have been called.

7. The method of claim 6, further including a step of waiting a predetermined time before initiating a call for a mobile communication device if the real-time status of that mobile communication device indicates the associated user is unavailable.

8. The method of claim 7, wherein the retrieving and waiting steps are repeated for the unavailable mobile communication device until the real-time status of the mobile communication device indicates that the associated user is available.

9. The method of claim 6, further including a step of waiting for the recipient of each call to answer before connecting the call to the mobile communication device.

10. A personal call center system, the system comprising:
    a first server for facilitating telephone calls for at least one user of a personal call center, each user being associated with a mobile communication device, the server being programmed to perform the steps of:
    receiving a list of contact numbers for a given user, each contact number corresponding to a call to be made for a given mobile communication device on behalf of an associated user,
    determining, based on a schedule of the given user of the call center, whether the given user is available for calls to be made;
    retrieving based on said determining, a real-time status of each mobile communication device;
    initiating, if the real-time status indicates that the given user is available, a call to a recipient from the list of contact numbers;
    connecting the call to the given mobile communication device associated with the user;
    repeating the initiating and connecting steps to call a next contact number on the list of contact numbers upon a detection of completion of the call until each contact number on the list has been called; and
    notifying the mobile communication device after all contact numbers on the list have been called.

11. The system of claim 10, further including a second server configured to determine a real-time status of each mobile communication device associated with a user, wherein the first server communicates with the second server to verify that a mobile communication device is available before the first server initiates a call to a contact number.

12. The system of claim 10, wherein the first server facilitates calls to a group of users, each associated with a mobile communication device, and is further programmed to determine which of the group of users is available to take calls and, for those users determined to be available, performing the steps of initiating and connecting calls.

13. The system of claim 10, wherein the first server is configured to detect whether the recipient of an initiated call is unavailable and leave a prerecorded message on a voicemail of the recipient.

* * * * *